United States Patent [19]

Hesse

[11] Patent Number: 4,516,723
[45] Date of Patent: May 14, 1985

[54] FINE-DROPLETS SPRAYER SYSTEM FOR TERRAIN VEHICULAR USE

[76] Inventor: Myron C. Hesse, 9955 Bloomfield Dr., Omaha, Nebr. 68114

[21] Appl. No.: 412,097

[22] Filed: Aug. 27, 1982

[51] Int. Cl.³ .................. B05B 3/02; A01G 25/09
[52] U.S. Cl. ............................ 239/77; 239/172; 239/214.13
[58] Field of Search ...... 239/171, 172, 222.11–222.21, 239/173, 174, 77, 78, 129, 130, 146, 147, 214.13, 222; 222/318, 178; 416/207, 208

[56] References Cited

U.S. PATENT DOCUMENTS

| | | | |
|---|---|---|---|
| 231,068 | 3/1865 | Hurd | 239/214.13 |
| 1,433,159 | 10/1922 | Sharp | 239/214.13 |
| 2,515,792 | 7/1950 | Ofeldt | 239/77 X |
| 2,979,269 | 2/1956 | Bals | 239/77 |
| 3,357,496 | 12/1967 | Petersen | 416/207 |
| 3,589,613 | 6/1971 | Saladin | 239/171 X |
| 3,655,130 | 4/1972 | Patrick | 239/222 X |
| 3,706,417 | 12/1972 | Patrick | 239/222 X |
| 4,172,557 | 10/1979 | Davis | 239/77 |

FOREIGN PATENT DOCUMENTS 1151218  6/1956  France.

Primary Examiner—Andres Kashnikow
Assistant Examiner—Kevin Patrick Weldon
Attorney, Agent, or Firm—George R. Nimmer

[57] ABSTRACT

A sprayer system to apply concentrated agricultural chemicals in fine-droplets within the range of about 10 to 300 microns.

A blower and a reservoir tank of agricultural chemical are carried by a terrain traversing vehicle the blower airstream passing through a volute that is axially equipped with a vanes type revolvable sprayhead having agricultural chemical delivered thereto by a hose-line. The blower airstream impinges upon the vanes, which rotates the sprayhead causing atomization into fine-droplets, and also castably sprays the liquid droplets toward crop foliage. The volute is desireably equipped with louvers to control the spraying direction, and the sprayhead vanes are desireably adjustable to control sprayhead rotational speed and the resultant droplet size of the emerging chemical.

3 Claims, 5 Drawing Figures

FINE-DROPLETS SPRAYER SYSTEM FOR TERRAIN VEHICULAR USE

For spraying agricultural chemicals such as insecticides, herbicides, foliant feeds, etc., several economic factors must be taken into consideration. The primary economic consideration is to guard against surplusage application of the expensive agricultural chemical, and which was dealt with in the early prior art by heavily diluting the chemical with water or other diluent. However, the art recognized that dilution has economic drawbacks becuase diluted chemical has such lowered viscosity and surface tension that it will not adhere well to the crop being sprayed. Thus, the more recent trend is to spray agricultural chemicals utilizing minimal dilution though, for economic reasons, in fine-droplets on the order of about 10 to 300 microns. Heretofore, fine-droplets spraying has been attainable only in conjunction with aircraft spraying, the aircraft velocity through the ambient air enabling the attainment of fine-droplets.

Attainment of fine-droplets spraying by aircraft methods does have certain disadvantages, one of which is the high economic costs coincident with owning, renting, and generally operating aircraft. Another disadvantage is uneven-application, namely that fine-droplets emerging with aircraft spraying tend to settle upon the topical side only of the foliage and primarily upon higher foliage elevations. As a result of uneven-application, the foliage underside and lower foliage growth is generally deprived of benefit from aircraft spraying methods. Though terrain vehicular application techniques do not inherently suffer from the disadvantages of high operational costs and uneven-application, the prior art has been unable to develop terrain vehicular means that will attain fine-droplets spraying of concentrated agricultural chemicals.

It is accordingly the general object of the present inventions to provide terrain vehicular means for spraying concentrated agricultural chemicals in fine-droplets whereby the spraying operation results in both uniform foliage applications and in heretofore unattainable economic advantage.

With this general objective in view, and with other objects and advantages that will become more apparent as this description proceeds, the fine-droplets sprayer for terrain vehicular use generally comprises: blower means mountable onto a tractor-drawn trailor or other vehicle, and delivering an airstream through an axially extending volute having an inlet-mouth and an outlet-mouth; a vanes t type sprayhead revolvably mounted along the volute axis and hence downstream of the blower means; and a reservoir of agricultural chemical introduced via a hoseline to the inlet-end of the revolvable sprayhead, whereby as the blower airstream impinges against the vanes, the sprayhead revolves to atomize the liquid chemical into fine-droplets and which are castably sprayed by said airstream toward the crop foliage. Desireable optional features include equipping the volute with adjustable louvers to control spraying direction, and having the sprayhead vanes of adjustable attitude thereby controlling sprayhead rotational speed and the chemical droplet size emerging therefrom.

In the drawing, wherein like characters refer to like parts in the several views, and in which.

Figure 1:
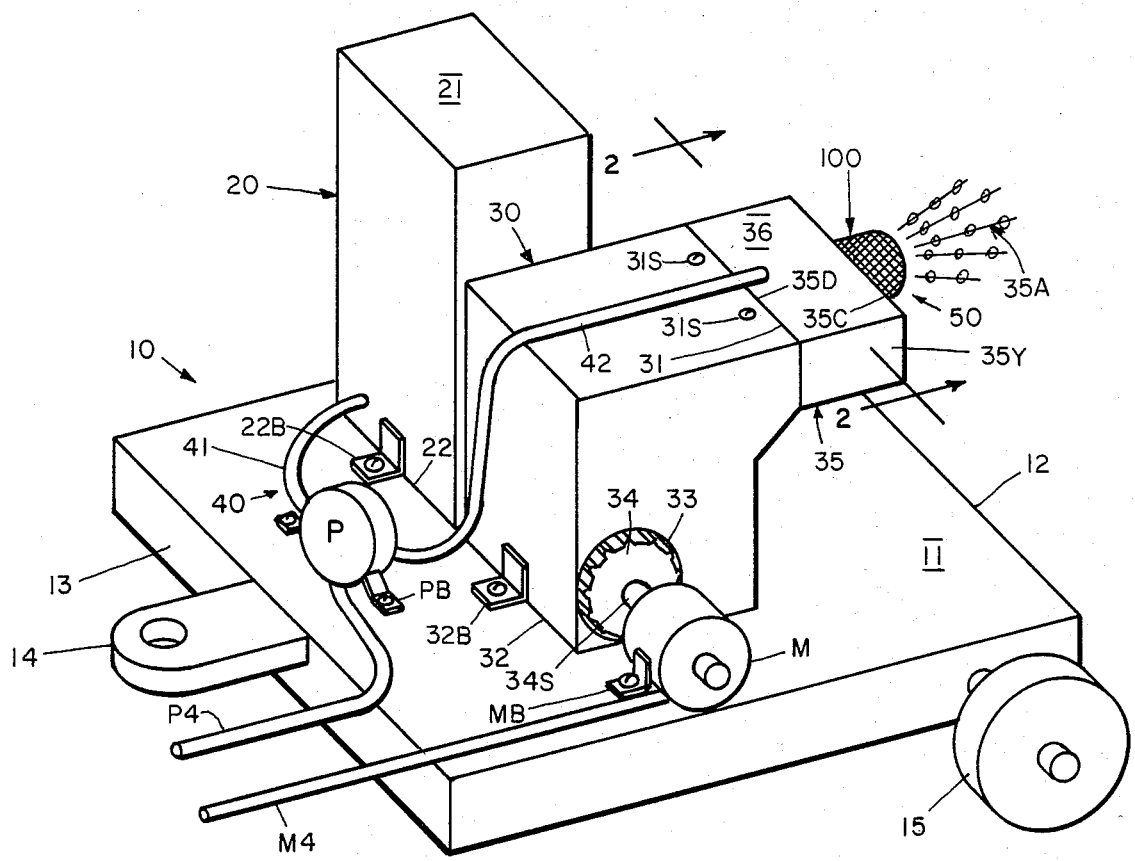
FIG. 1 is a perspective view of a basic embodiment of the fine-droplets sprayer system carried by a trailer type vehicle means.

Turning initially to drawing FIG. 1, the fine droplets sprayer system for vehicular use generally comprises a vehicle means (10) extending in longitudinal direction from a drayable leading-end (13) to a trail-end (12). Though the vehicle means 10 shown takes the representative form of a drayable (14) trailer having supporting wheels (15) to permit terrain traversal, the vehicle means might take numerous other specific forms. For example, the sprayer system assembled parts e.g. reservoir 20, hose means 40, housed blower 30, volute 35, sprayhead 50, might be mounted at the power-takeoff of a self-propelled tractor vehicle.

For representative vehicle means 10 shown and having exposed surface 11, a reservoir tank 20 for the highly concentrated chemical to be sprayed has upper extremity 21 and lower extremity 22 and there mounted by brackets 22B to vehicle 10. Transversely alongside reservoir tank 20 is a housing 30 for a blower means 34, said housing having a larger lower part 32 surrounding blower means 34 (herein shown as the conventional cylindrical type) and a tapered upper part terminating at 31. Housing 30 is mounted by brackets 32B to vehicle 10, and the shaft 34S for blower means 34 (partially seen at housing opening 33) is rotated by suitable driving means e.g. motor M attached by mounts MB to vehicle 10. There are pump means e.g. pump P attached at PB to vehicle 10, and adapted to pump liquid from reservoir 20 along hose means 40 to volute supported sprayhead 50. Herein, the hose means includes a reservoir-hose 41 extending from reservoir 20 to pump P and also includes a volute-hose 42 extending from pump P to the leadward portion 35D of volute 35. Powering means for pump means P and driving means M extend toward the powered drayage means (e.g. a tractor, or the like) and are represented by power lines P4 and M4, respectively. Thus, the airstream generated by the blower means (34) enters volute inlet-mouth 35D and proceeds along volute horizontal longitudinal-axis 35A toward volute outlet-mouth 35C. As will be pointed out, the blower means airstream both actuates the sprayhead means (50) and castably sprays the emerging fine-droplets chemical toward the targeted growing crop.

Figure 2:
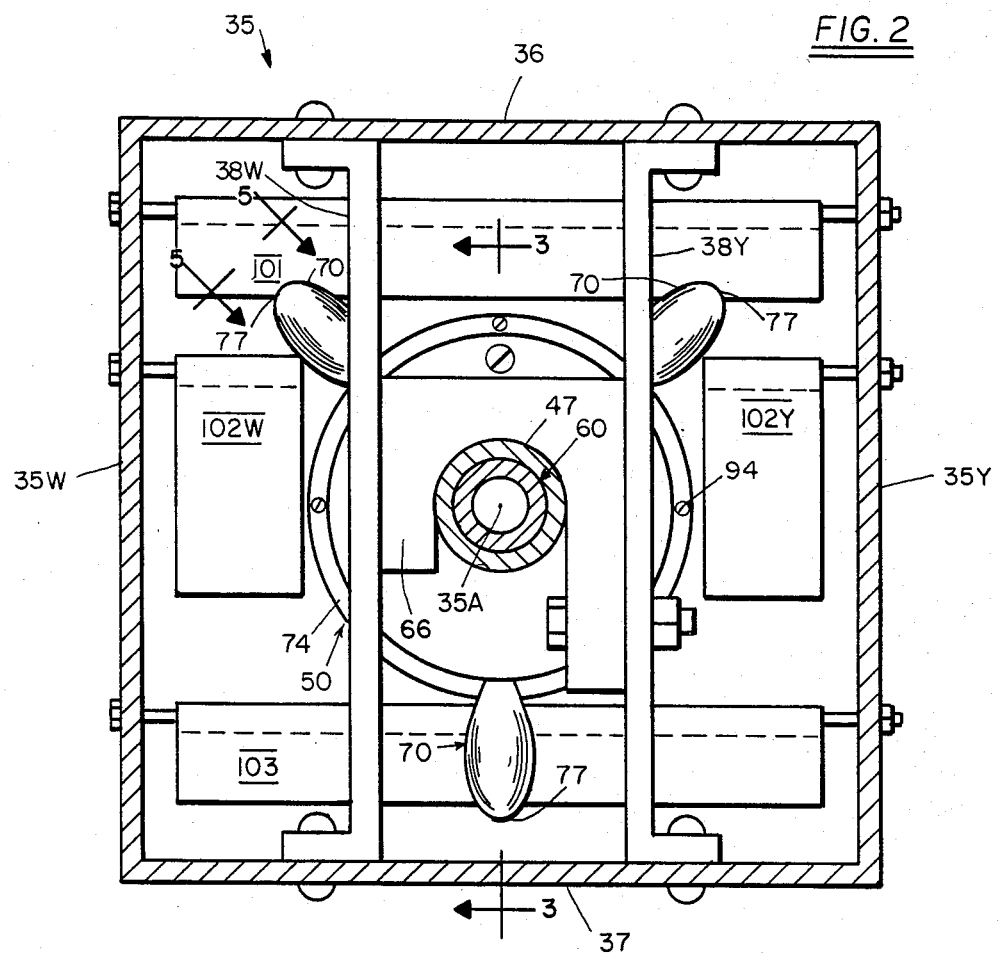
FIG. 2 is a sectional elevational view taken along lines 2—2 of FIGS. 1 and 3.

Volute 35, which is removably attached (as by screws 31S) in communicating relationship to the housing elevated downstream end 31, supports the sprayhead means (50) along volute axis 35A. As best seen in FIG. 2, volute 35 has wall means (e.g. 35W, 35Y, 36, 37) surrounding axis 35A and the co-axial sprayhead means 50. Opposed bars 38W and 38Y are each attached to the volute walls 36 and 37 in flanking relationship to axis 35A. Located between bars 38W and 38Y is a block 66 of inverted J-shape having its longer leg attached by studs 67 to bar 38Y. Block 66 constrictably surrounds annular shock-absorber 65 which in turn surrounds rigid tube 60 thereby maintaining sprayhead means 50 in surrounding relationship to volute axis 35A.

Figure 4:
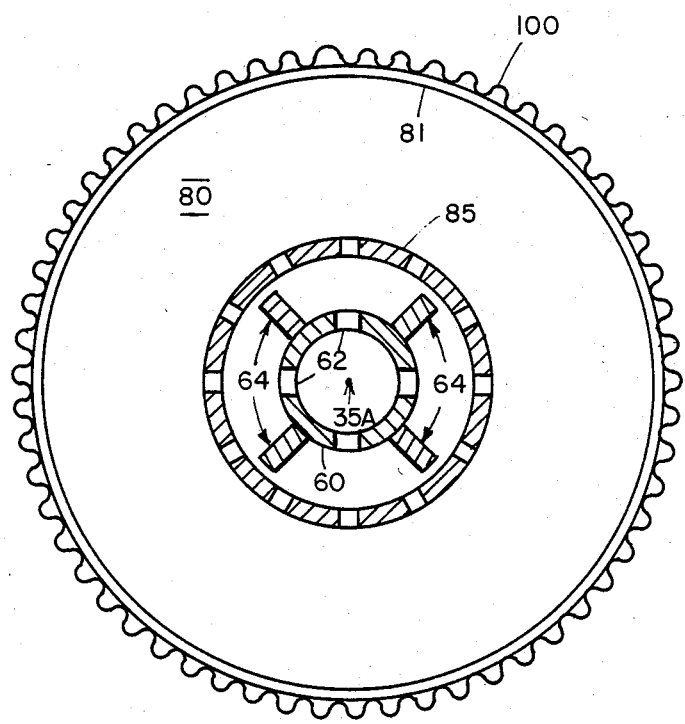
FIG. 4 is a sectional elevational view taken along line 4—4 of FIG. 3.
Figure 3:
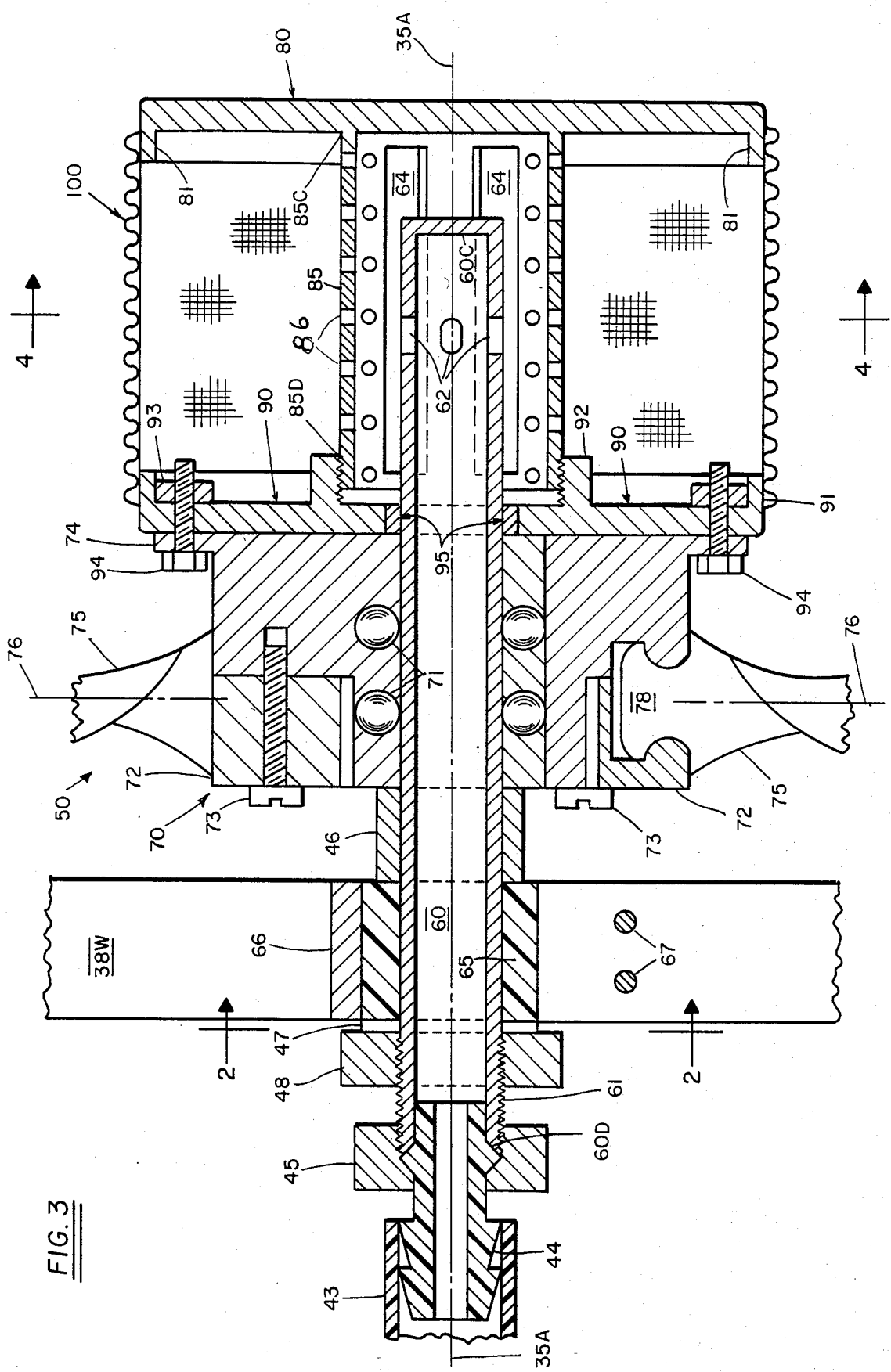
FIG. 3 is a sectional elevational view taken along line 3—3 of FIG. 2, and with the optional louvers deleted.

As seen in FIGS. 3 and 4, the sprayhead means (e.g. 50) generally comprises a rigid and fixed tube 60 lying alongside volute axis 35A and having a threaded inlet-end 60D located nearer to volute inlet-mouth 35D and an outlet-end (60C, 62) located nearer to volute outlet-mouth 35C. Trailward terminus 43 of volute-hose 42 communicates with tube inlet-end 60D via circumferentially grooved adapter 44 which is removably maintained at inlet-end 60D with threadedly engaged collar 45. Another threadedly engaged collar 48 and intervening washer 47 assist in maintaining tube 60 in non-rotating and longitudinally immovable relationship to axis 35A. A shank 70 revolvably surrounding tube 60 (e.g. with ball bearings 71) carries a plurality of radial vanes (each extending along vane-axis 76). Thus, the blower means airstream impinging upon vanes 75 causes rotation of shank 70. And co-rotatably associated with shank 70 is a multiperforate diffuser 85 circularly surrounding tube outlet-end 60C and a sleeve-like screen 100 circularly surrounding diffuser 85. Accordingly, whenever pump P and motor M are actuated, chemical emerging from tube outlet openings 62 will be whipped by the co-rotating diffuser 85 and screen 100 into fine-droplets which are castably sprayed toward targeted growing vegetation by the blower means airstream. The spraying direction might be controlled by louvers (e.g. 101, 102W, 102Y, 103) which are attached to volute 35 in adjustable attitudes as indicated in FIG. 2 phantom lines.

From drawing FIGS. 3 and 4, other permissible refinements of the sprayhead means (50) can be seen. For example, multiperforate diffuser 85 might have a threaded open-end 85D and a closed-end 85C integrally connected to a circular trail-plate 80 having a circular flange 81. Surrounding liquid-impervious gasket 95 is a lead-plate 90 having circular flange 91 and having an integrally connected boss 92 threadedly engaged with diffuser open-end 85D. Sleeve-like screen 100 is supported at plates' flanges 81 and 91. Screws 94 (passing through shank flange 74, lead-plate 90, and grommets 93) maintain co-rotatable relationship of diffuser 85 and screen 100 with the shank 70 that is rotatable about stationary tube 60. To maintain the spread of chemical along the longitudinal extent of multi-perforate diffuser 85, the trailward length of tube 60 might be provided with a plurality of radiating web-like deflectors 64.

Figure 5:
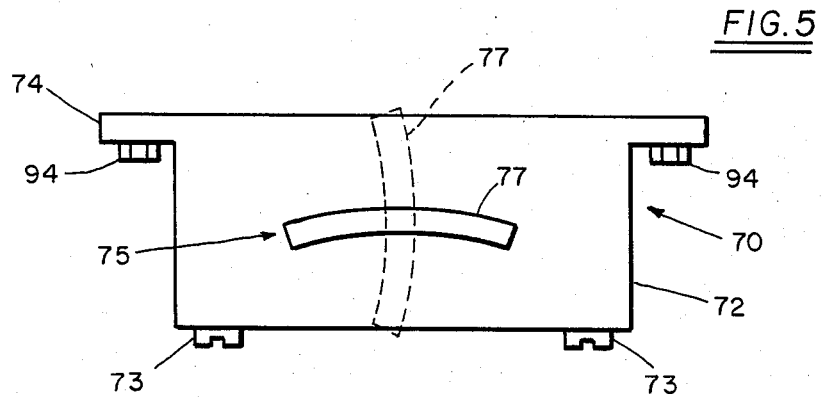
FIG. 5 is a detail view taken along line 5—5 of FIG. 2

There are means to controllably vary the droplet size of the liquified chemical emerging from the tube open-end. Though the droplet size might be controllably varied by varying the mesh of screen 100 or by varying the aperture sizes employed for diffuser 85, such techniques require at least partial disassembly and considerable changeover time. Accordingly, the preferred means is to controllably vary the rotational speed of the co-rotatable screen and multi-perforate diffuser. In this manner, progressively higher rotational speeds result in progressively smaller droplet sizes. Since it is impractical to controllably vary the velocity of the airstream generated by the blower means (34), the better approach is to utilize contoured and twistably adjustable blades as the vane means. For example, remote from blade tip 77, each such contoured blade 75 might have a cross-sectionally circular base-end 78 twistably adjustable with shank 70. In this regard, shank 70 might include a girth-ring part 72 removably attached by screws 73 and supporting the blades base-ends 78 against the shank body. Thus, temporary loosening of screws 73 will permit blades 75 to be adjustably twisted about their axes 76 (as indicated in FIG. 5 phantom line) whereby the rotational speed of co-rotatable screen 100 and diffuser 85 will be controlled, though the blower airstrem velocity remains substantially constant.

Operation of the fine-droplets sprayer system, though having already been alluded to, might be summarized as follows. As the vehicle means (e.g. 10) is traveling across the orchard or other agricultural terrain, and with vanes 75 adusted, pump P and motor M are actuated. Pump P causes liquified chemical to proceed from reservoir 20 via hose means 40 along axial tube of the volute-supported sprayhead means 50. Motor M causes the blower means 34 to deliver an airstream into volute inlet-mouth 35D, said airstream impinging upon vanes 75 and causing co-rotation of shank 70, diffuser 85, and screen 100. Thus, liquid emerging from tube outlet-end openings 62 is spread by stationary deflectors 64 along rotating diffuser 85 whereby the liquid emerges radially in relatively large droplets size from diffuser 85. These relatively larger droplets are reduced to the desired fine-droplets size durring passage through rotating screen 100 whereupon the fine-droplets are castably sprayed by the blower means airstream toward targeted agricultural foliage. Louvers might be adjusted to control the spraying direction. At any time, pump P and motor M might be temporarily deactivated to permit re-adjustment of vanes 75 to control the fine-droplets size emerging from rotating screen 100.

From the foregoing, the construction and operation of the fine-droplets sprayer system for terrain vehicular use will be readily understood and further explanation is believed to be unnecessary. However, since numerous modifications and changes will readily occur to those skilled in the art, it is not desired to limit the invention to the exact construction shown and described, and accordingly, all suitable modifications and changes and equivalents may be resorted to, and falling within the scope of the appended claims.

What is claimed is as follows:

1. In combination with a longitudinally extending surface vehicle means for rollably traversing along agricultural terrain, a fine-droplets agricultural sprayer system for castably spraying highly concentrated chemical in liquid form from said traversing vehicle toward growing vegetation, and comprising:

A. a reservoir tank for said highly concentrated chemical, said reservoir tank being attached to said vehicle means;
  B. a housed blower means attached to said vehicle means and said blower means communicating with an attached volute extending along a substantially horizontal longitudinal-axis, said volute having an inlet-mouth and an outlet-mouth for respectively receiving and discharging an airstream from the blower means;
  C. pumping means attached to said surface vehicle means and adapted to pump said liquid from said reservoir along a hose means into the volute;
  D. said hose means including a reservoir-hose extending from the reservoir to the pump means and a volute-hose extending from the pump means to the volute and therewithin communicating with the inlet-end of a sprayhead means axial tube portion; and
  E. said sprayhead means being attached to and surrounded by the volute and comprising:
    Ei. said axial tube lying substantially parallel to the volute longitudinal-axis and including said inlet-end located nearer to the volute inlet-mouth and an outlet-end located nearer to the volute outlet-mouth, Eii. a plurality of web-like deflectors radiating outwardly from said axial tube at the outlet-end thereof, Eiii. a shank revolvably surrounding the axial tube between inlet-end and outlet-end, Eiv. a longitudinal multi-perforate diffuser surrounding the tube outlet-end and said web-like deflectors and being threadedly engaged with said shank, Ev. a sleeve-like screen surrounding said diffuser and being co-rotatable with said shank and diffuser, and Evi. a plurality of vanes respectively radiating from the shank along a vane-axis and being of the contoured blade type whereby said blower means airstream impinging upon the vanes causes rotation of the shank about the tube, each contoured blade vane having a baseend adjustably twistably secured to said shank about the vane-axis whereby rotational speed of the shank diffuser and screen might be controllably adjusted for substantially constant velocity of the airstream emerging from said housed blower means, whereby liquid being pumped into the tube inlet-end and emerging from the tube outlet-end will be whipped by the rotating diffuser and screen into fine-droplets which is also castably sprayed by the blower airstream toward growing vegetation.

2. The sprayer system of claim 1 wherein the volute is louvered to provide directional control for the fine-droplets being castably sprayed by said blower airstream.

3. The sprayer system of claim 1 wherein the tube inlet-end carries a circumferentially multi-grooved adapter; and wherein the hose means volute hose is removably connected to said adapter.

* * * * *